June 4, 1968   R. H. PAULUS   3,387,197

PRIMARY SPEED CONTROL FOR AN INDUCTION MOTOR

Filed April 30, 1965   2 Sheets-Sheet 1

INVENTOR.
REINHARD H. PAULUS
BY

INVENTOR.
REINHARD H. PAULUS

United States Patent Office 3,387,197
Patented June 4, 1968

3,387,197
PRIMARY SPEED CONTROL FOR AN INDUCTION MOTOR
Reinhard H. Paulus, Milwaukee, Wis., assignor to Allen-Bradley Company, Milwaukee, Wis., a corporation of Wisconsin
Filed Apr. 30, 1965, Ser. No. 452,066
2 Claims. (Cl. 318—229)

ABSTRACT OF THE DISCLOSURE

The disclosed embodiment is an automatic speed control for an induction motor driving a sewage pump. Rectified samplings of stator current and stator terminal voltage are fed through variable resistors to the control windings of a magnetic amplifier, the output of which drives an SCR. The SCR is connected in series with the control windings of a frequency doubler. The primary windings of the doubler are connected to a power line, and the secondary windings are connected to the stator of the motor.

---

This invention relates to a speed control system for an induction motor. More particularly the invention relates to a speed control system wherein samplings of stator voltage and stator current of the motor may be taken by static means and then compared to produce a feedback error signal proportional to the difference between the desired speed and actual speed of the motor. The error signal is applied to a controllable power source supplying electrical power to the motor such that the signal controls the amount of electrical power delivered to the motor.

The present invention pertains to a control system for an induction motor excited by a constant frequency source and which system has automatic feedback for speed control. Induction motor speed control systems of this type heretofore known can be generally classified in two categories.

One class is characterized by a tachometer-generator coupled to the motor and a separate reference voltage source. The tachometer-generator generates a voltage proportional to the actual motor speed and the reference voltage is preset to a value proportional to the desired motor speed. The two voltages are compared thereby providing an error signal representative of the difference in actual and desired motor speed. The error signal, in turn, controls the amount of electrical power delivered to the motor. This class of speed control systems, like the present system, may be incorporated to provide a constant speed for various loads connected across the motor. In essence, systems of this class are constant speed, variable torque systems. A limitation of this type of system is that it requires a tachometer and a separate reference voltage source to obtain an error signal. Accordingly, the end result is a complex system of considerable size. To overcome the size limitation, some of these systems utilize the rotor frequency of a wound rotor motor. The frequency is proportional to the motor slip and serves as an actual speed signal permitting dispensing of the tachometer-generator. However, even without the tachometer-generator, a reference voltage source is required and the system cannot be applied to squirrel cage motors, as there is no known way to get the rotor voltage therefrom.

The second class of induction motor speed control systems of the present type retains a constant stator voltage and a speed varying according to the motor load, i.e. a variable-speed, variable-torque system. This class may be characterized by a variable impedance in series with the stator windings and the power supply source with an associated rotor impedance to maintain a constant stator voltage. The present system is distinguishable from this class in that there is no attempt to maintain a constant stator voltage.

Accordingly, an object of the present invention is to provide a speed control system for an induction type motor in which all components, with the exception of the motor being controlled, may be static. Accordingly, since the control system is static, it is reliable, efficient and compact.

Another object of this invention is to provide a static speed control system that may operate at a constant speed with varying loads.

A further object of the present invention is to provide a static speed control system that may operate at various speeds for a constant load.

The speed control system of the present invention is characterized by the fact that the stator impedance of an induction motor is dependent upon the speed of the motor. The stator impedance, in turn, is reflected in the stator voltage and stator current values and, accordingly, the actual motor speed is reflected in these values. An induction motor may operate at a desired speed for a certain motor load and at the same instant the load changes, the motor speed tends to change with a corresponding change in the stator impedance, stator voltage and stator current values. Thus, a comparison of stator voltage and stator current samplings reflects the change in actual motor speed from the desired value.

An embodiment of the present system may include two control or transforming circuits connected across the stator windings of the motor with one circuit receiving a sampling of the stator voltage and the other receiving a sampling of the stator current. Each of the control circuits transform their respective current and voltage samplings to output signals of the same mode and which are a function of the sampling. The value of the output signals are dependent on the transform ratio of the control circuits and the magnitude of the sampling. The transform ratio of the illustrated embodiment is determined by the impedance values of the control circuits which are preset to a value corresponding to the desired motor speed such that while the motor operates at the desired speed, the difference in the values of the output signals is approximately zero. However, upon a change in motor speed, the magnitude of the stator voltage and stator current samplings change such that there is a potential difference across the two control circuits. As taught by this invention, a comparison of the potential difference provides an error signal representative of the difference in desired and actual motor speed. The error signal is utilized to control a power modulator supplying power to the motor such that the power delivered by the power modulator varies according to the error signal value. The change in power delivered to the motor in turn changes the motor speed bringing the speed to the desired value.

The invention further teaches that by including means for adjusting the transform ratio of either or both control circuits, the preset desired speed of the motor can be adjusted independently of the load. For example, by including a variable resistance in either or both control circuits, the preset speed can be adjusted by changing the resistance in either or both control circuits. Thus, for applications requiring that the desired speed be adjusted according to various conditions, the transform ratio in one or both transforming circuits may be adjusted according to the condition.

The foregoing principles, objects and further principles and objects will appear in the description to follow. In the description, reference is made to the accompanying drawings which form a part hereof and in which there is shown by way of illustration a specific embodiment of this invention as practiced in a sewage control system. This embodiment will be described in sufficient detail to enable those skilled in the art to practice this invention, but it is to be understood that there are numerous other embodiments and uses of the invention and that changes may be made in the body of the invention without deviation from the principles of the invention. Consequently, the following detailed description is not to be taken in a limiting sense; but instead the scope of the present invention is best defined by the appended claims.

Figure 1:
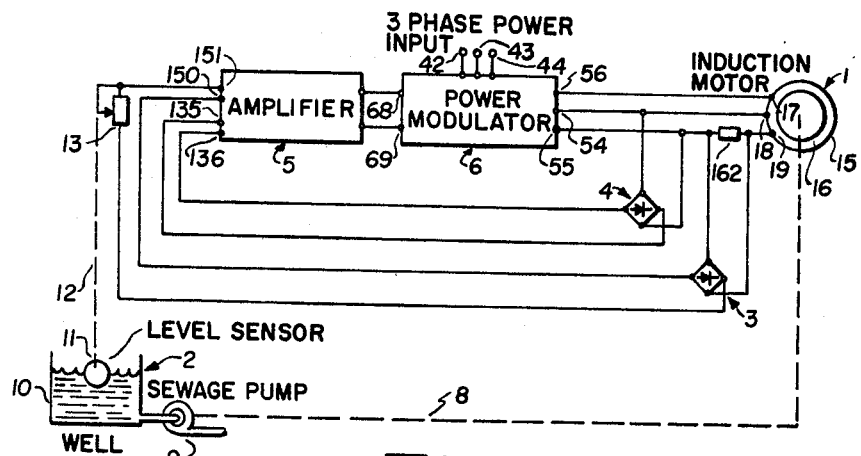
FIG. 1 illustrates in block diagram from an adjustable static speed control according to this invention as applied to a sewage-pump system.

For purposes of illustration, the present invention is shown herein as incorporated in an adjustable speed sewage-pump system. In sewage well applications, the load on the pump motor remains relatively constant and the desired motor speed changes according to the amount of sewage to be pumped. FIG. 1 sets forth the major components of the system including an induction motor referred to by the general reference character 1, a sewage well and accompanying apparatus referred to by the general reference character 2, a transforming or control circuit receiving a sampling of the stator current of the motor 1 and referred to by the general reference character 3, a transforming or control circuit receiving a sampling of the stator voltage of the motor 1 and referred to by the general reference character 4, a comparator circuit in the form of an amplifier receiving the transformed stator voltage and current samplings and referred to by the general reference character 5, and a power modulator delivering controlled power to the motor 1 and referred to by the general reference character 6.

Briefly, the sewage well 2 includes a sewage pump 9 mechanically coupled to the motor 1 and used for pumping sewage from a well 10. The rate that the pump 9 pumps sewage from the well 10 depends on the driving speed of the motor 1. The actual speed is reflected in the stator impedance of the motor which impedance is reflected in the values of stator current and stator voltage. The current through the stator windings of the motor 1 is sampled by the control circuit 3 and the voltage of the stator windings of the motor 1 is sampled by the control circuit 4. The control circuits 3 and 4 convert the current and voltage samplings to two corresponding direct current signals of the same mode such that rather than having a current and a voltage signal, both signals may be viewed as two voltage signals. The direct current signals are applied to the comparator 5 which is illustrated in the form of a direct current amplifier. The amplifier 5 produces an amplified direct current error signal proportional to the difference of the two direct current signals and the error signal serves as a control signal for the power modulator 6. The magnitude of the error signal controls the power delivered by the modulator 6 in such a way to keep the speed in close limits regardless of the load on the motor. Accordingly, if the speed of the motor deviates from the desired value, the error signal deviates until the speed reaches the desired value at which point the error signal approaches zero.

It may be noted that the net resistance values of the control circuits 3 and 4 determine the transform ratio of the circuits and, in turn, determines the value of the direct current control signals delivered to the comparator 5. Depending on the desired speed, these transform values are preset to a "balanced condition" so that at the desired speed the difference in the direct signals is zero. Thus, a difference in the direct current signals of the control circuits 3 and 4 may be realized in three ways: (1) changes in the actual motor speed from the desired motor speed while the net resistance of the control circuits 3 and 4 remain at the preset values; (2) changes in the transform ratio of either or both the control circuits 3 and 4; and (3) changes in the actual motor speed and changes in the transform ratios of the control circuits 3 and 4, i.e., a combination of (1) and (2). Sewage pump applications as illustrated herein utilize all three means. Using the sewage level as an index for determining pump speed, the speed will increase as the level rises and decrease as the level lowers. Thus, the sewage level is kept in close limits and the adjustable speed drive synchronizes the pump discharge to the sewage inlet flow, even though the consistency of the sewage may effect the load on the motor.

Thus, it is necessary to have a continuous means sensing the sewage level. In the illustrated embodiment, the sewage level within the well 10 is sensed by a level sensor 11. The level sensor 11 carries a mechanical coupling 12 connected to a variable means for controlling the output potential of the control circuit 3. In the embodiment of FIG. 1 this variable means comprises a variable resistor 13 associated with the control circuit 3. The variable resistor 13 serves as a voltage divider with the voltage division dependent on the position of the level sensor 11. The variable resistor 13 is connected in series with the control circuit 3 such that the net resistance of the control circuit 3 is dependent on the position of the sensor 11. Thus, the "balanced condition" and desired speed of the motor 1 are controlled and adjusted by the resistor 13. When sewage level is high, the motor 1 and pump 9 operate at a high rate of speed and as the sewage level decreases, the desired speed decreases. It shall also be noted that once the resistor 13 adjusts to a different desired speed, an error signal exists until the actual motor speed coincides with the desired speed.

The foregoing is a brief description of the illustrated embodiment of a static speed control system as taught by this invention. It shall be noted that outside of the apparatus to which the motor 1 is delivering mechanical power and the level sensing arrangement, the only moving part of the control system is the motor 9 itself. There is no complex generator-motor speed controller, or separate tachometer-generator with associated voltage reference source. The speed is controlled exclusively by the net resistance values of the control circuits 3 and 4 and the signal samplings across the control circuits 3 and 4.

Figure 2:
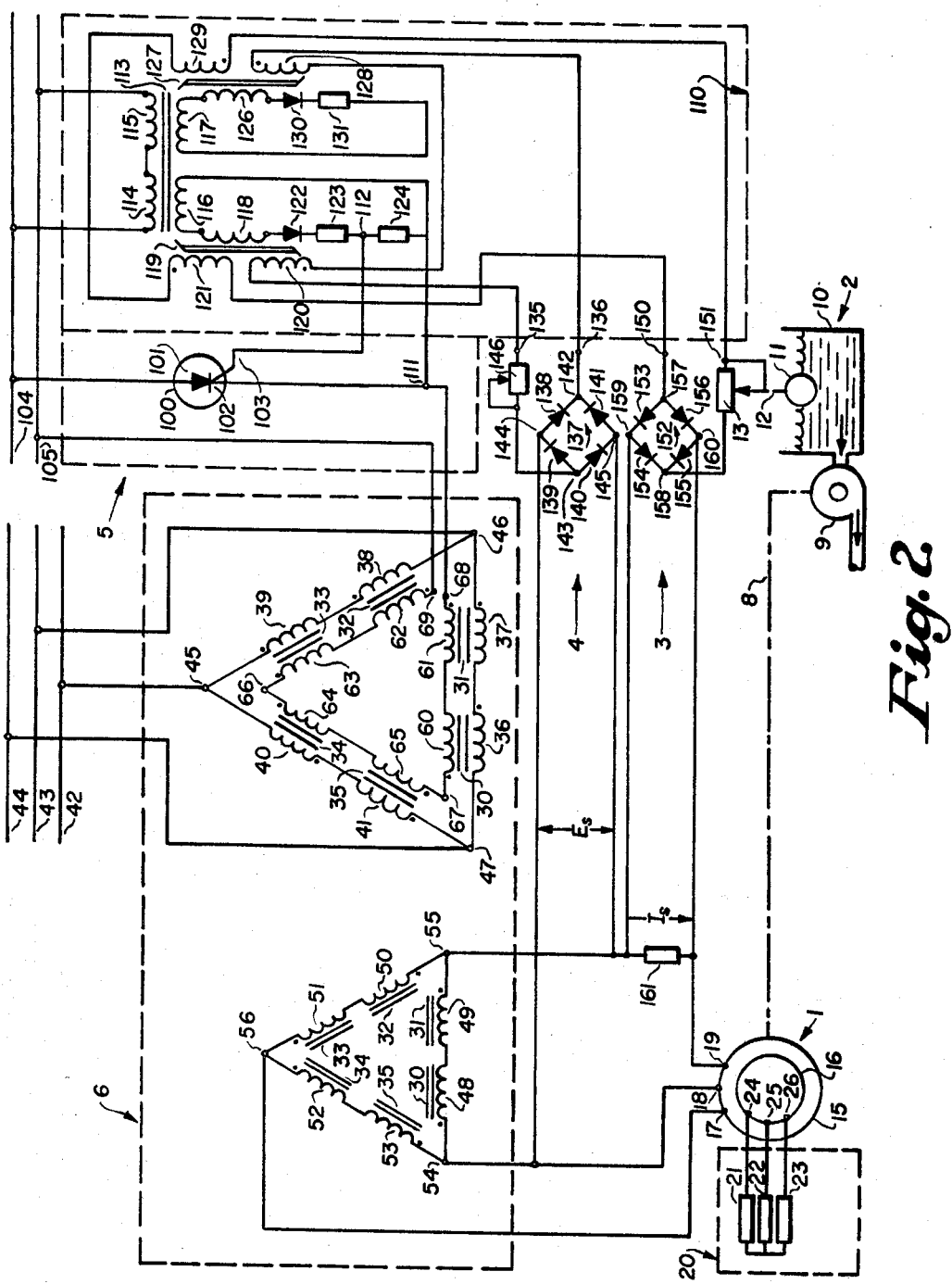
FIG. 2 illustrates a wiring schematic of the static speed control of FIG. 1.

FIG. 2 illustrates in more detail the control system of FIG. 1. Referring first to the induction motor 1, the motor has a stator winding designated by the circular symbol 15 and a rotor winding designated by the circular symbol 16. The stator winding 15 receives a three-phase power input signal between a set of three input terminals 17, 18 and 19. A rotor network 20 is connected to the rotor 16. The network 20 comprises three resistive elements 21, 22 and 23 connected in Y to a set of terminals 24, 25 and 26.

The induction motor 1 receives electrical power from the power modulator 6 connected to the stator terminals 17, 18 and 19. The power modulator 6 shown herein incorporates a set of six magnetic, saturable cores designated by the numerals 30, 31, 32, 33, 34 and 35. The cores 30–35 each carry an input winding designated by the numerals 36–41, respectively. The input windings 36–41 are connected in a delta configuration with the windings 36 and 37 being connected in series and provide one leg of the delta. The windings 38 and 39 are connected in series and provide a second leg of the delta, whereas the serially connected windings 40 and 41 provide the third leg of the delta. The delta-configuration input windings receive input power from a three-phase source designated by lines 42, 43 and 44. The power line 42 is connected to an input terminal 45 common to the input windings 39 and 40. The power line 43 is connected to an input terminal 46 common to the input windings 37 and 38 and the power winding 44 is connected to an input terminal 47 common to the input windings 36 and 41.

The saturable magnetic cores 30–35 each carry an output winding associated with the input windings 36–41. For means of clarity in studying the drawings, the cores 30–35 with their associated output windings are illustrated in FIG. 2 to the left of and adjacent the input windings 36–41. The core 30 carries an output winding 48, the core 31 an output winding 49, the core 32 an output winding 50, the core 33 an output winding 51, the core 34 an output winding 52 and the core 35 an output winding 53. The output windings 48–53 are connected in a delta configuration with the windings 48 and 49 being connected in series and providing one leg, the windings 50 and 51 being connected in series and providing a second leg, whereas the serially connected windings 52 and 53 provide a third leg. The windings 48 and 53 are connected in common at a terminal 54 which is common with the input terminal 18 of the stator winding 15. The windings 49 and 50 are connected in common at a terminal 55 which is connected to the input terminal 19 of the stator winding 15, and the windings 51 and 52 are connected in common at a terminal 56 which is common with the input terminal 17 of the stator winding 15.

Referring to the cores 30–35 having the delta connected input windings 36–41, it should be further noted that associated with each of the cores 30–35 there is a third winding, hereinafter referred to as a control winding or a bias winding. The core 30 carries a control winding 60, the core 31 a control winding 61, the core 32 a control winding 62, the core 33 a control winding 63, the core 34 a control winding 64 and the core 35 a control winding 65. The control windings 60–65 are connected in a series so as to accommodate their respective delta-connected input windings 36–41. The control windings 60 and 61 provide one leg of the delta, the control windings 62 and 63 a second leg and the control windings 64 and 65 the third leg. The windings 63 and 64 are connected in common to a terminal 66 and the windings 60 and 65 connected in common to a terminal 67. The winding 61 has one terminal connected in series with the winding 60 and a second terminal 68 to receive an input signal. The winding 62 is connected in series with the winding 63 and also has a second terminal 69 to receive an input signal. It may be noted that the two control windings associated with each leg of the delta are of opposite polarity.

Connected between the input terminals 68 and 69 of the control windings 60–65 of the power modulator 6 is the output of the amplifier circuit 5. The amplifier circuit 5 includes a silicon-controlled rectifier (SCR) 100. The rectifier 100 has an anode element 101, a cathode element 102 and a gate element 103. The cathode element 102 of the rectifier 100 is connected to the input terminal 68 and the anode 101 of the rectifier 100 is connected to one side of a single-phase, alternating-current voltage source designated by the lines 104 and 105 with the line 104 connected to the anode 101. The line 105 is connected to the input terminal 69 of the control windings such that there is a complete circuit between the line 104, the rectifier 100, the control windings 60–65 and the line 105.

Also comprising part of the amplifier circuit 5 is a firing circuit separately illustrated by the block diagram designated by the general reference character 110. The firing circuit 110 shown therein comprises a standard magnetic amplifier connected between the gate element 103 and the cathode element 102 of the silicon-controlled rectifier 100. The firing circuit 110 is connected to the cathode element 102 at a terminal 111 and to the gate element 103 at a terminal 112. The firing circuit 110 includes a step-down transformer 113. The transformer 113 has a pair of input windings 114 and 115 connected in series across the line terminals 104 and 105. The transformer 113 has a pair of output windings 116 and 117. One side of the output winding 116 is connected in common with the terminal 111 and the other side of the output winding 116 is connected in series with a gate winding 118 of a saturable core transformer 119 has a pair of input windings 120 and 121 linking the winding 118. In series with the gate winding 118 is a diode element 122 and a pair of resistive elements 123 and 124. The resistive element 124 is connected in common with the transformer winding 116 thereby providing a complete circuit between the transformer windings 116 and 118, the diode 122, the resistor 123 and the resistor 124. The resistor 124 is also connected across the gate element 103 and the cathode element 102 of the silicon controlled rectifier 100.

Linking the input winding 115 of the transformer 113 is the output winding 117. The winding 117 is connected in series with a gate winding 126 of a saturable core transformer 127. The transformer 127 has a pair of input windings 128 and 129 linking the winding 126. The gate winding 126 is also connected in series with a diode element 130 and a resistive element 131 the opposite end of which is connected to the winding 117 thereby providing a complete circuit between the transformer windings 117 and 126, the diode 130 and the resistive element 131. The input winding 120 of the transformer 119 and the input winding 128 of the transformer 127 are connected in series. Also the input winding 121 of the transformer 119 and the input winding 129 of the transformer 127 are connected in series, thus, completing the firing circuit 110.

The control circuit 4 may be viewed as having a pair of output terminals 135 and 136 with the terminal 135 connected to one side of the input winding 120 of the transformer 119 and the terminal 136 connected to one side of the input winding 128 of the transformer 127. Thus, there is a complete circuit between the terminal 135, the input windings 120 and 128, and the terminal 136. The control circuit 4 includes a full-wave bridge rectifier designated by the general reference character 137. The bridge consists of a set of four diodes 138, 139, 140 and 141. The cathodes of the diodes 138 and 141 are connected in common at a terminal 142 and the anodes of the diodes 139 and 140 are connected in common at a terminal 143. The anode of the diode 138 and the cathode of the diode 139 are connected in common at an input terminal 144 and the cathode of the diode 140 and the anode of the diode 141 are connected in common at an input terminal 145. The terminal 143 is also connected in series with a resistive element 146 and the terminal 135. The input terminal 144 of the bridge 137 is connected in common with the terminal 54 of the power modulator 6 and the terminal 118 of the stator winding 15 of the motor 1. The input terminal 145 of the bridge rectifier 137 is connected in common with the terminal 55 of the power modulator 6, thereby completing the circuitry of the control circuit 4.

The control circuit 3 may be viewed as having a pair of output terminals 150 and 151. The terminal 150 is connected to one side of the input winding 121 of the transformer 119 and the terminal 151 to one side of the input winding 129 of the transformer 127. Thus, there is a complete circuit between the terminal 150 and the input windings 121 and 129 and the terminal 151. The control circuit 3 includes a full-wave bridge rectifier designated by the general reference character 152. The bridge 152 consists of a set of four diodes 153, 154, 155 and 156. The anodes of the diodes 153 and 156 are connected in common at a terminal 157 and the cathodes of the diodes 154 and 155 are connected in common at a terminal 158. The cathode of the diode 153 and the anode of the diode 154 are connected in common at an input terminal 159 and the cathode of the diode 156 and the anode of the diode 155 are connected in common at an input terminal 160. In series with the terminal 158 and the terminal 151 is the variable resistive element 13. Across the input terminals 159 and 160 is a resistive element 161. The resistive element 161 is also connected in series with the terminal 55 of the power modulator 6 and the terminal 19 of the stator winding 15 of the motor 1 thereby completing the circuit wiring diagram of the static speed control system as shown in FIG. 2.

Figure 3:
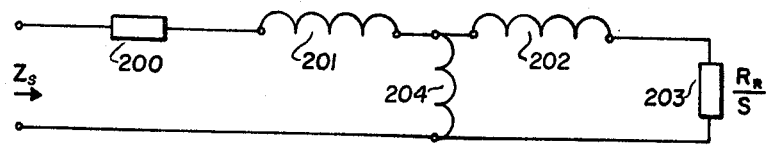
FIG. 3 is an equivalent circuit of an induction motor.
Figure 4:
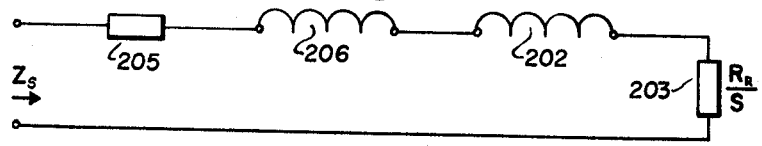
FIG. 4 is the Thévénin's theorem equivalent of the circuit of FIG. 3.

The theroretical operation of the control circuit shown herein is believed to be as hereinafter set forth. First, it is fundamental that an induction motor has both resistive and reactive features similar to that of a transformer. For practical purposes in examining its operation, an induction motor may be viewed as an electrical circuit similar to the equivalent circuit of a transformer. Thus, as set forth in FIG. 3 and looking into its stator terminals, an induction motor appears as a series-parallel circuit. In FIG. 3, the stator impedance is represented by the series combination of a resistive element 200 and an inductive reactance element 201. The rotor impedance is represented by the series combination of an inductive reactance element 202 and a resistive element 203. Also the mutual reactance resulting from the transformer action between the stator and rotor windings is represented by the symbol 204 in parallel with the rotor impedance elements 202 and 203. For a clearer understanding, the equivalent circuit shown in FIG. 3 may be further simplified by writing its Thévénin's theorem equivalent. In FIG. 4, the Thévénin's theorem equivalent of the circuit of FIG. 3 is shown as a circuit consisting of a resistive component 205, an inductive component 206, the inductive component 202 and the resistive component 203. It may be noted that the mutual reactance component 204 of FIG. 3 is reflected into the stator impedance components 200 and 201 of FIG. 3, thus deriving the components 205 and 206 of FIG. 4.

It is an inherent feature of an induction motor that the net rotor resistance, as viewed from the stator winding, is inversely proportional to the motor slip, wherein slip is defined as the difference between the synchronous and actual speed of the motor. Thus, the resistive component 203 which symbolizes the net rotor resistance has an effective value $R_R/S$ where $R_R$ represents the actual resistance of the rotor winding and S the motor slip. Also in the Thévénin's theorem equivalent circuit the total value of the resistive components 206 and 202 may be represented by the symbol Z, such that the total impedance ($Z_S$) looking into the stator terminals may be represented as $$Z_S = Z + R_R/S$$

making it apparent that the net stator impedance of an induction motor is dependent upon the slip of the motor which in turn, is dependent on the motor speed. Thus, as the difference between the synchronous speed and the actual speed increases such that the slip increases, the stator impedance ($Z_S$) decreases. At the same time, as the actual speed approaches the synchronous speed the slip decreases and the stator impedance ($Z_S$) increases.

Figure 5:
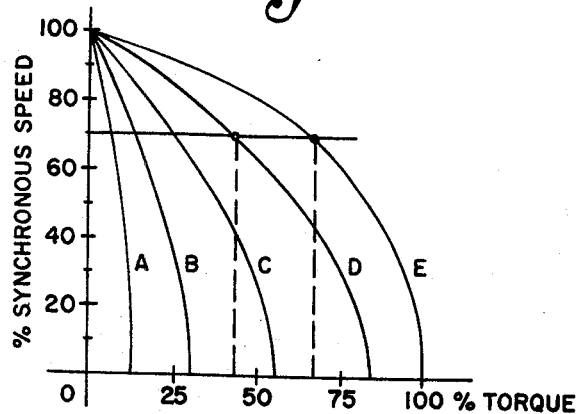
FIG. 5 is a graphical analysis of a speed-torque relationship explanatory of the operation of the present system.

A further principle of induction motors is set forth in the graph of FIG. 5. The graph illustrates the speed-torque relationship of a typical induction motor with secondary resistors. Curves are represented illustrating the speed-torque relationship of various stator voltages with curves A, B, C and D representing reduced stator voltage and curve E full stator voltage. The graph shows that to maintain a constant speed for various loads the stator voltage must be varied. For example, it will be assumed, for the present, that it is desirable to operate an induction motor at 70% synchronous speed and with 40% full torque. The necessary stator voltage for these conditions is represented by the curve D. If while operating under these conditions the load across the motor increases so as to demand 60% full torque one of two changes may take place: (1) the speed decreases to 44% synchronous speed and the stator voltage held constant; or (2) the stator voltage increased to the value represented by curve E and the speed held constant at 70% synchronous speed.

As previously mentioned the present system may be used in applications requiring variable-speed, constant-load or constant-speed, variable-load. The operation of the present system for applications demanding variable-speeds and constant-load (as generally required in sewage pump applications) has been briefly discussed in connection with FIG. 1. This operation will be further developed in the following discussion, which discussion also illustrates how the present system may be used for applications demanding constant-speed, variable-loads. For variable-speed, constant-load applications, the transform ratio or net resistance of the control circuits was varied. It will be seen that for constant-speed, variable-load applications, the transform ratio or net resistance of the control circuits is held constant with the error signal depending on the variations of the voltage and current samplings with changing loads.

In constant-speed, variable-load applications, the desired speed remains constant and is always known. Also, the static rotor resistance ($R_R$) is known, such that the net rotor resistance $R_R/S$ can be determined. The value of the net rotor resistance $R_R/S$, as shown in FIG. 4, is reflected in the stator winding and represented by the ratio of the stator voltage sampling $E_S$ across the terminals 54 and 55 of the power modulator 6 and the current $I_S$ through the resistor 161, i.e. $E_S/I_S$. Thus, at the desired speed, the value of $E_S/I_S$ is known. Since the ratio of the input signals to the transforming or control circuits 3 and 4 is known, the transform ratio of these circuits can be selected such that when operation is at the desired speed the signals applied to the comparator are such that the error signal is theoretically zero.

This principle is realized in the illustrated embodiment in the following manner. The sampling $E_S$ is applied to the terminals 144 and 145 of the bridge rectifier 137, and the rectifier 137 changes the sampling $E_S$ to a corresponding direct current voltage signal appearing cross the terminals 135 and 136. At the same time the stator current sampling $I_S$ is applied to the terminals 159 and 160 of the bridge rectifier 152, and the rectifier 152 changes the sampling $I_S$ to a corresponding direct current voltage signal appearing across the terminals 150 and 151. The amplifier 5 receives and compares the direct current signals of the control circuits 3 and 4 which comparison provides an error signal. As previously mentioned the values of the direct current signals are dependent on the transform ratio or effective resistance of the control circuits 3 and 4. Thus, for constant speed operation, since the value $E_S/I_S$ is known the effective resistance values of the control circuits 3 and 4 are preselected and held constant, so that at the desired motor speed the control circuits are "balanced" and there is no difference in the direct current voltage signals of the control circuits 3 and 4. Accordingly, so long as the actual motor speed corresponds to the desired motor speed, the value $E_S/I_S$ remains constant, the error signal is close to zero and the power delivered by the power modulator 6 to the motor 1 remains constant.

At the instant the load across the motor changes the motor speed tends to change. If the load increases, the motor speed tends to decrease and the net rotor resistance $R_R/S$ changes, in turn changing the values of the voltage sampling $E_S$ and the current samplings $I_S$. Since in a constant-speed, variable-load arrangement resistance of the control circuits 3 and 4 remains constant, the system is no longer in the "balanced condition." There exists a difference in the direct current signals of the control circuits 3 and 4, said difference increasing as the deviation in the preset speed and actual speed increases. As previously mentioned, the direct current signals are applied to the amplifier 5 and the difference provides an error signal proportional to that difference. The error signal appears across the input terminals 68 and 69 of the control windings 60–65, and as more clearly set forth later, controls the power delivered by the power modulator 6 to the motor 1. Upon a change in load, the error signal senses a need for a change in power to maintain the motor speed and controls the power modulator 1 accordingly. Upon receiving the change in power the motor assumes the desired speed while delivering the necessary torque. Upon assuming the desired speed the net rotor resistance $R_R/S$ returns to the original value and the system assumes the "balanced condition." The system retains the "balanced condition" until there is a further change in the load.

In the present embodiment, in order to realize an error signal proportional to the difference in the actual and desired motor speed, the direct current voltage signals of the control circuits 3 and 4 are fed into the firing circuit 110 of the amplifier 5. The firing circuit 110 compares the direct current signals and supplies a firing signal to the gate 103 which is proportional to the comparison. The firing circuit 110 is a common and well known magnetic amplifier circuit. (For a similiar firing circuit see General Electric SCR Manual, second edition, 1961, p. 42.) Briefly, the step-down transformer 113 takes a single phase alternating current voltage from the lines 104 and 105 and drops the voltage to the value which can be accommodated by the saturable core reactors 119 and 127. The input windings 120 and 121 of the saturable core reactor 119 receive the direct current signal of the control circuits 3 and 4. The windings 120 and 128, on the one hand and the windings 121 and 129 on the other hand, are of opposite polarity, thereby providing a net core flux representative of the difference between the two control signals. The gate winding 118 of the saturable core reactor 119 is in series with the winding 116, diode 122 and resistors 123 and 124. Depending on the net flux produced by the input windings 121, 129 and 120, 128, the magnetic amplifier fires at a certain angle of the applied voltage, and the larger the net flux the earlier it fires. As soon as reactor 118 fires a current produced by the transformer winding 116 is flowing through the gate winding 118, diode 122, resistors 123 and 124. The voltage drop which is produced by the current through resistor 124 fires the silicon controlled rectifier 100. The resistor 123 limits current to the gate 103 to its rated value. The diode 122 prevents a reverse voltage on the gate 103 and prevents any reverse current through the gate winding 118 which would produce an undesired reset.

The circuit comprising the winding 117, transformer 127, diode 130 and resistor 131 operate in a manner similar to that of winding 116, transformer 119, diode 122, and the resistors 123 and 112. The purpose of this circuit is to reset the circuit comprising the transformer 119. The current through the windings of the transformer 127 is reflected in the windings of the transformer 119 such that after each half cycle the core 119 is reset. In similar manner, during the conduction period of the transformer 119, it resets the transformer 127. Thus, the voltage across the gate winding 118, which is dependent on the ratio of the signals provided by the control circuits 3 and 4 determines the value of the signal across the resistor 124 which acts as the gate signal between the gate element 103 and the cathode element 111 of the silicon controlled rectifier 100.

To further amplify the signal of the firing circuit 110, the rectifier 100 receives the signal between its gate element 103 and cathode element 102. The rectifier 100 is connected across the A.C. terminals 104 and 105. As is well known to those familiar with silicon controlled rectifiers the conduction period of the silicon controlled rectifier 100 is determined by the firing signal appearing between the gate control element 103 and the cathode 102. During the conduction period a signal from the lines 104 and 105 passes through the rectifier 100. Since the rectifier 100 is a unidirectional device the signal passing is a direct current signal proportional to the ratio of the control signals delivered by the control circuits 3 and 4 which, in turn, is dependent on the motor speed. Obviously, numerous direct current amplifiers may be incorporated in the present speed control system and the foregoing is only a brief discussion of the amplifier shown herein. For a more detailed discussion of this amplifier refer to the above cited reference.

The direct current output signal of the amplifier 5 is applied to the power modulator 6 and acts as a control signal for the modulator. There are various power modulators available which will receive a direct current signal, and in turn, control the three phase output power of the modulator according to the value of the control signal. For example, United States Patent 3,127,547, entitled Infinite Speed Ratio Stationary Control System for Induction Type Motors, issued on May 31, 1964, to Paul Peter Biringer and Gordon Richard Slemon, illustrates such a power modulator in FIG. 13 of the patent. The theoretical operation of the power modulator illustrated herein will be described briefly as it is illustrated and described in greater detail in my copending application Ser. No. 452,050, filed Apr. 30, 1965.

Briefly the power modulator 6 is a delta connected, frequency-multiplying modulator including six saturable core transformers. The modulator 6 receives a 60 cycle three-phase signal from the power lines 42, 43, and 44 and provides a three-phase 120 cycle power source across the output terminals 54, 55 and 56. The direct current signal from the amplifier 5 determines the bias point on the saturable cores 30–35. The bias point on the cores 30–35 in turn determines the amount of current transformed from the input windings 36–41 to the secondary windings 48–53. Since the direct current on the control windings 60–65 is dependent on the direct current signals of the circuits 3 and 4, the values of the signals delivered by the control circuits 3 and 4 will control the amount of power appearing across the secondary windings 48–53 of the power modulator 6. The voltage across the secondary windings 48–53 is applied to the stator windings 17, 18 and 19 of the motor 1 thus controlling the voltage of the said motor.

As discussed in connection with the variable-speed, constant-torque characteristics of the present invention, the effective resistance of the control circuit 3 is altered by means of the variable resistor 13. Further, increasing the versatility of the system, a variable resistance similar to the resistor 146 may be placed in the control circuit 4. The resistor 146 influences the value of the direct current signal across the terminals 135 and 136 such that the "balance condition" of the control circuits 3 and 4 may be varied over a wide range. Obviously, the resistors 13 and 146 may be calibrated in speed such that they may be preset to a desired speed.

It shall also be noted that across the rotor winding 16 of the motor 1 is a standard rotor network. The purpose of the rotor network is twofold. First, it is commonly known that for a given rotor current a starting torque of an induction motor can be increased if the phase angle between the rotor voltage and the rotor current is decreased. The rotor circuit of an induction motor has a fixed reactance since the frequency is constant; therefore, by increasing the rotor resistance the current and voltage will be more nearly in phase thus increasing the starting torque. To obtain a high starting torque for a squirrel-cage motor the end rings are made of higher resistance and for a wound-rotor motor as shown an external resistance similar to that of the rotor network 20 is connected across the rotor windings.

It is not particularly significant here that the control of the induction motor 1 is effected through the stationary element or stator 15 of the motor 1. On the contrary, the invention relates to a speed control of an induction motor through the motor element that is connected directly to the power lines 42, 43 and 44, and that motor element, the stator 15 in this embodiment, is more appropriately termed the "primary" 15 to distinguish the present invention from the common type of induction motor control that operates in the secondary circuit, which is the rotor 16 in this embodiment. In this embodiment the control circuit 3 samples stator current and provides a D.C. potential proportional to stator current, and this control circuit 3 may be more aptly referred to as the "primary current detector" 3, since it detects the amount of current flowing through the motor "primary" 15 and provides a proportionate feedback signal, which may be termed the "primary current feedback signal." Also, this embodiment has another control circuit 4 that samples the voltage across the stator and provides a D.C. potential proportional to that voltage, and, consistent with the foregoing terminology, this control circuit 4 may be referred to as the "primary voltage detector" 4, since it detects the voltage level across the "primary" 15 and provides a proportionate "primary voltage feedback signal." The previously noted variable resistor 13 for controlling output potential may be more descriptively termed the "speed control potentiometer" 15, those skilled in the art being aware of the various equivalents that may be substituted for the conventional potentiometer. As is apparent from the foregoing disclosure, the "speed control potentiometer" 15 may be inserted in series with either the "primary current detector" 3 or the "primary voltage detector" 4, although in the disclosed embodiment it is connected in series with the "primary current detector" 3. The "primary current detector" 3 and the "primary voltage detector" 4, one or the other of which may include the "speed control potentiometer" 15, are connected to what is called the comparator circuit 5, or amplifier 5, in the disclosed embodiment, but which may be more descriptively called the "error detector" 5. The "error detector" 5 compares the "primary current feedback signal" and the "primary voltage feedback signal," and if the proportionality or ratio of those two feedback signals deviates from a preset or programmed proportionality or ratio, the "error detector" 5 will emit an "error signal" that reflects the deviation. The "error detector" 5 is connected to the "controllable A.C. power supply" 6, which in the disclosed embodiment is the power modulator 6, that is responsive to the "error signal" so that the "controllable A.C. power supply" 6 may automatically vary the power fed to the "primary" 15 according to the command of the "error signal."

As previously mentioned, the control system shown herein permits many alternations and a number of circuit designs not specifically mentioned in this description. For example, rather than convert the alternating current samplings to direct current samplings and then comparing them, the alternating current samplings could be compared directly. Another embodiment may include variable transformers in transforming the voltage and current samplings such that the transforming ratio would be dependent on the setting of either or both variable transformers. Accordingly, the invention is best defined by the appended claims.

I claim:

1. A primary speed control for an induction motor comprising the combination of:
a controllable A.C. power supply responsive to an error signal to energize the primary of an induction motor;
a primary current detector includes a rectifier connected across a resistance in series between said controllable A.C. power supply and said primary, and said rectifier has output terminals across which appears a D.C. primary current feedback signal potential proportional to current through said primary;
a primary voltage detector including a rectifier connected across said primary of said induction motor and said rectifier has output terminals across which appears a D.C. primary voltage feedback signal potential proportional to the voltage across said primary;
an error detector including a magnetic amplifier having control windings and output windings, one of said control windings being connected in series with said output terminals of said primary current detector, another of said control windings being connected in series with said output terminals of said primary voltage detector, said control windings connected to said primary current detector and said primary voltage detector having opposite polarities, and a silicon-controlled rectifier having a main circuit connected in series with a signal source and said controllable A.C. power supply, and having a gate circuit connected across said output windings of said magnetic amplifier in said error detector;
said controllable A.C. power supply being connected to said error detector to receive said error signal from said error detector for controlling the output of said A.C. power supply to said primary;
and a speed control potentiometer connected in series with the output terminals of said primary current detector.

2. A primary speed control for an induction motor as set forth in claim 1 wherein
said controllable A.C. power supply includes a voltage doubler having series connected input windings connected across an A.C. power line, series connected output windings connected across said primary, and series connected control windings connected in series between said silicon-controlled rectifier and said signal source.

References Cited

UNITED STATES PATENTS

| | | | |
|---|---|---|---|
| 2,608,676 | 8/1952 | MacCallum et al. | 318—230 |
| 2,707,260 | 4/1955 | Rhyne et al. | 318—229 |
| 2,719,255 | 9/1955 | Behr et al. | 318—229 |
| 2,722,643 | 11/1955 | Rhyne | 318—230 |
| 2,793,338 | 5/1957 | Rhyne | 318—229 |
| 3,125,711 | 3/1964 | Carlson | 318—229 |
| 3,127,547 | 3/1964 | Biringer et al. | 318—229 |
| 3,177,419 | 4/1965 | Brook et al. | 318—228 |

ORIS L. RADER, *Primary Examiner.*

G. RUBINSON, *Assistant Examiner.*